United States Patent
Scolari et al.

(10) Patent No.: US 8,944,452 B1
(45) Date of Patent: Feb. 3, 2015

(54) NON-MOTORIZED SCOOTER

(71) Applicant: Zike, LLC, Greenville, SC (US)

(72) Inventors: Nathan Scolari, Greenville, SC (US); George Reiter, Taylors, SC (US)

(73) Assignee: Zike, LLC, Greenville, SC (US)

( * ) Notice: Subject to any disclaimer, the term of this patent is extended or adjusted under 35 U.S.C. 154(b) by 0 days.

(21) Appl. No.: 13/828,925

(22) Filed: Mar. 14, 2013

(51) Int. Cl.
*B62M 1/30* (2013.01)
*B62M 5/00* (2006.01)
*B62K 3/00* (2006.01)

(52) U.S. Cl.
CPC . *B62M 1/30* (2013.01); *B62M 5/00* (2013.01); *B62K 3/002* (2013.01)
USPC ............................ 280/221; 280/253; 280/258

(58) Field of Classification Search
CPC ............ B62M 1/30; B62M 1/34; B62M 5/00; B62K 3/002
USPC .......................................... 280/220, 221, 253
See application file for complete search history.

(56) References Cited

U.S. PATENT DOCUMENTS

| | | | |
|---|---|---|---|
| 1,468,346 A | 9/1923 | Gedeon et al. | |
| 4,186,934 A | 2/1980 | Collings | |
| 4,799,701 A * | 1/1989 | Lindau et al. | 280/87.041 |
| 4,861,054 A | 8/1989 | Spital | |
| 6,334,838 B1 * | 1/2002 | Lee | 482/51 |
| 6,352,270 B1 * | 3/2002 | Wu | 280/87.041 |
| 6,716,141 B2 | 4/2004 | Bhoopathy | |
| 7,044,488 B1 * | 5/2006 | Hamend | 280/221 |
| 7,125,029 B2 * | 10/2006 | Knox et al. | 280/229 |
| 7,377,532 B2 | 5/2008 | Bauce | |
| 7,686,317 B2 | 3/2010 | Hartmann | |
| 7,914,027 B2 * | 3/2011 | Yu | 280/221 |
| 8,128,111 B2 | 3/2012 | Scolari et al. | |

FOREIGN PATENT DOCUMENTS

| | | |
|---|---|---|
| WO | 0230732 A1 | 4/2002 |
| WO | 2007147951 A1 | 12/2007 |
| WO | 2012131537 A1 | 10/2012 |

* cited by examiner

*Primary Examiner* — Kevin Hurley
(74) *Attorney, Agent, or Firm* — McNair Law Firm, P.A.; Douglas W. Kim

(57) ABSTRACT

A non-motorized scooter comprising a frame carrying a front wheel assembly, a rear wheel assembly, and a handle bar assembly operatively associated with the front wheel assembly; a first lever arm pivotally mounted on the frame; a second lever arm pivotally mounted on the frame adjacent the first lever arm, wherein the first and second lever arms move up and down in a lever action and define a rider platform; a drive unit operatively connected to the first and second lever arms and the rear wheel assembly so that the up and down lever action turns a rear wheel; and, a detent lock releasably securing the first and second lever arms to the frame to resist the up and down lever action of the lever arms until the detent lock is released.

20 Claims, 11 Drawing Sheets

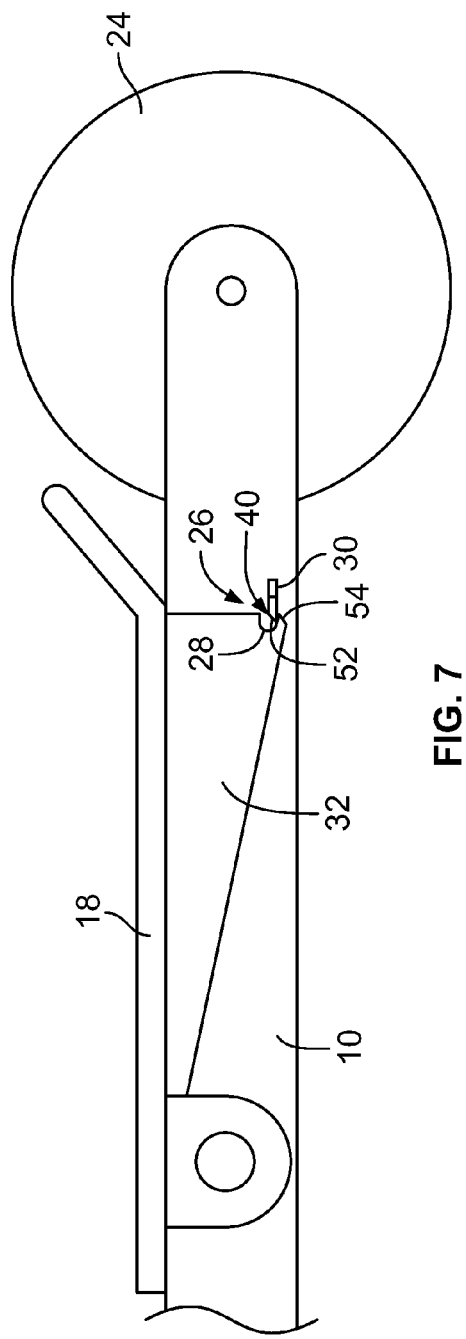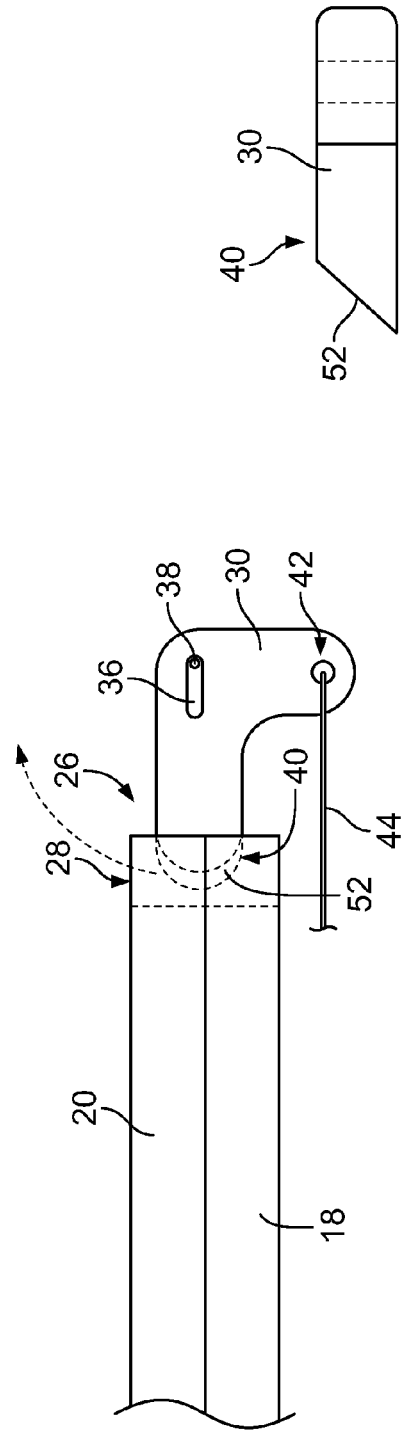

NON-MOTORIZED SCOOTER

BACKGROUND OF THE INVENTION

1) Field of the Invention

The present invention relates to non-motorized scooters, and more particularly, to a scooter having a rider platform operable between a fixed stationary platform and a lever action in which the rider can move adjacent section of the platform up and down to propel the scooter.

2) Description of Related Art

Various scooter design are known in the prior art. A typical non-motorized scooter has a stationary platform carried on a frame between front and rear wheel assemblies. The rider must pushes off with one foot and then coasts while standing on the platform.

Other non-motorized scooters include various lever drive systems in which a pair of adjacent lever arms are provided to operate a drive system to turn a rear wheel. These scooters allow the rider to propel the scooter without touching the ground, but do not offer a fixed platform on which the rider can simply coast.

Also, braking systems for such scooters are often nonexistent, inadequate for the job, or unnecessarily complicated and expensive to manufacture and assemble.

Accordingly, it is an object of the present invention to provide a scooter with a rider platform that can switch between a fixed stationary platform for coasting, and a pair of lever action arms which can operate a drive system to propel the scooter as desired.

It is a further object of the present invention to provide a scooter with a drive system adapted to accommodate a rider platform that can switch between a stationary platform and a lever action.

It is a further object of the present invention to provide a scooter with an improved brake system that is simple to operate, provides adequate braking power for the scooter, and is cost effective to manufacture and assemble.

SUMMARY OF THE INVENTION

The above objectives are accomplished according to the present invention by providing a non-motorized scooter comprising a frame carrying a front wheel assembly, a rear wheel assembly, and a handle bar assembly operatively associated with the front wheel assembly; a first lever arm pivotally mounted on the frame; a second lever arm pivotally mounted on the frame adjacent the first lever arm, wherein the first and second lever arms move up and down in a lever action and define a rider platform; a drive unit operatively connected to the first and second lever arms and the rear wheel assembly so that the up and down lever action turns a rear wheel; and, a detent lock releasably securing the first and second lever arms to the frame to resist the up and down lever action of the lever arms until the detent lock is released.

In a further advantageous embodiment, the detent lock includes a first detent lock portion carried on each of the first and second lever arms, and a second detent lock portion carried by the frame, wherein the first and second detent lock portions engage for holding the first and second lever arms in a down position generally level with the frame to provide a stable fixed rider platform, and disengage for allowing up and down pivoting movement of the first and second lever arms.

In a further advantageous embodiment, each of the first and second lever arms includes a lower extension plate projecting downward from a bottom side of each of the lever arms.

In a further advantageous embodiment, a plate slot is disposed in the frame receiving the lower extension plate on each of the lever arms when in a down position.

In a further advantageous embodiment, the detent lock includes a first detent lock portion defined by a lock slot disposed in a distal end portion of the lower extension plate on each of the lever arms.

In a further advantageous embodiment, the detent lock includes a second detent portion defined by a lock arm movably carried on the frame, wherein the lock arm is operable between a locked position received into the lock slot for holding the first and second lever arms in a down position, and an unlocked position in which the lock arm is removed from the lock slot allowing up and down pivoting movement of the first and second lever arms.

In a further advantageous embodiment, the lock arm is a generally L-shaped plate pivotally mounted on the frame, wherein a first distal end of the lock arm is operatively associated with the lock slot, and a second distal end of the lock arm is connected to an actuator cable so that movement of the actuator cable causes a pivotal movement of the lock arm to move between the locked and unlocked positions.

In a further advantageous embodiment, the actuator cable is operatively connected to a control member disposed on at least one of the handle bar assembly and either of the first and second lever arms.

In a further advantageous embodiment, the control member includes a hand lever carried on a handle bar of the handle bar assembly operatively connected to the actuator cable for pivoting the lock arm.

In a further advantageous embodiment, control member includes a foot lever carried on at least one of the first and second lever arms operatively connected to the actuator cable for pivoting the lock arm.

In a further advantageous embodiment, the lock arm includes a first slanted engaging face disposed on a distal end of the lock arm that is received into the lock slot.

In a further advantageous embodiment, the lower extension plate includes a second slanted engaging face complementary to the first slanted engaging face of the lock arm, wherein a downward movement of the lower extension plate directs the second slanted engaging face against the first slanted engaging face to cause a lateral movement of the lock arm so that the lock arm does not interfere with the downward movement of the lower extension plate.

In a further advantageous embodiment, the rear wheel assembly includes a brake unit operatively associated with the rear wheel.

In a further advantageous embodiment, the brake unit includes a support arm mounted to the frame and extending generally vertically adjacent the rear wheel, and a flexible brake arm carried on the support arm in a live hinge arrangement and extending laterally across the rear wheel, wherein a downward force on the flexible brake arm causes engagement with the rear wheel.

In a further advantageous embodiment, the brake unit includes a first support arm carried on a first side of the frame adjacent a first side of the rear wheel, a second support arm carried on a second side of the frame adjacent a second side of the rear wheel, and a brake lever pivotally carried by the first and second support arms and disposed above the rear wheel, wherein a downward force on the brake lever causes engagement with the rear wheel.

In a further advantageous embodiment, the drive unit includes a cam pivotally carried on a bottom side of at least one of the first and second lever arms.

In a further advantageous embodiment, the drive unit includes a drive shaft rotatably carried by the frame engaging the cam, a first sprocket carried by the drive shaft, a second sprocket carried by the rear wheel assembly, and the first sprocket connected to the second sprocket by a drive chain, wherein downward movement of the cam against the drive shaft causes rotation of the drive shaft to turn the first sprockets which turns the drive chain and second sprocket to rotate the rear wheel.

In a further advantageous embodiment, the drive unit includes a first cam carried on a bottom side of the first lever arm and a second cam carried on a bottom side of the second lever arm for engage the drive shaft, and a torsion spring operatively associated with each of the first cam and the second cam for biasing the cam against the drive shaft.

In a further advantageous embodiment, the drive unit includes a first sprocket carried on a first spindle rotatably carried by the frame, and the first and second lever arms operatively connected to the spindle for rotating the spindle when the lever arms move up and down; a second spindle rotatably carried by the frame and carrying a second sprocket and a first gear, wherein a first drive chain connects the first sprocket and the second sprocket so that rotation of first spindle causes rotation of the second spindle to turn the first gear; a third spindle rotatably carried by the frame and carrying a third sprocket and a second gear, wherein the second gear engages the first gear to turn the third spindle and the third sprocket in a direction opposite the first and second spindle; and, a forth sprocket carried by the rear wheel assembly operatively connected to the third sprocket by a second drive chain, wherein rotation of the third sprocket causes the forth sprocket to turn the rear wheel.

In a further advantageous embodiment, at least one torsion spring is carried by the frame operatively connected to each of the first and second lever arms for biasing the lever arms upward from the frame.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 7 shows a detailed side view of a detent lock for the lever arms according to the present invention;

FIG. 8 shows a detailed top view of the detent lock for the lever arms according to the present invention;

FIG. 9 shows a side view of a lock arm according to the present invention;

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention. Likewise, other objects, features, benefits and advantages of the present invention will be apparent from this summary and certain embodiments described below.

DETAILED DESCRIPTION OF A PREFERRED EMBODIMENT

Figure 1:
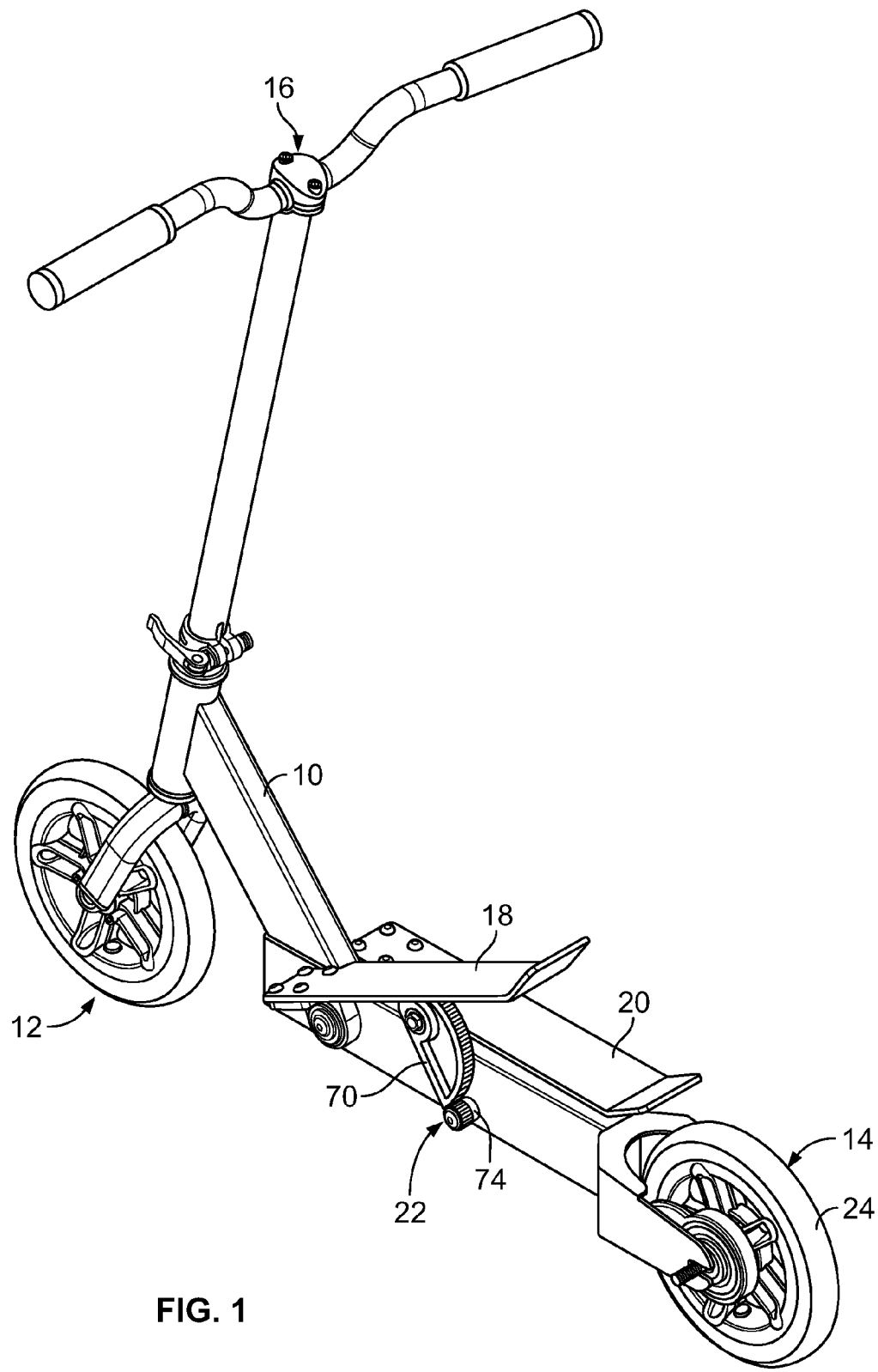
FIG. 1 shows a top perspective view of a first embodiment of a scooter according to the present invention.

With reference to the drawings, the invention will now be described in more detail. Referring to FIG. 1, a first embodiment of a non-motorized scooter is illustrated. In this embodiment, the scooter includes a frame 10 carrying a front wheel assembly, designated generally as 12. A rear wheel assembly, designated generally as 14, is carried generally at an opposite end of frame 10. A handle bar assembly, designated generally as 16, is provided extending upward from frame 10 and is operatively associated with front wheel assembly 12 for pivoting the wheel.

Figure 4:
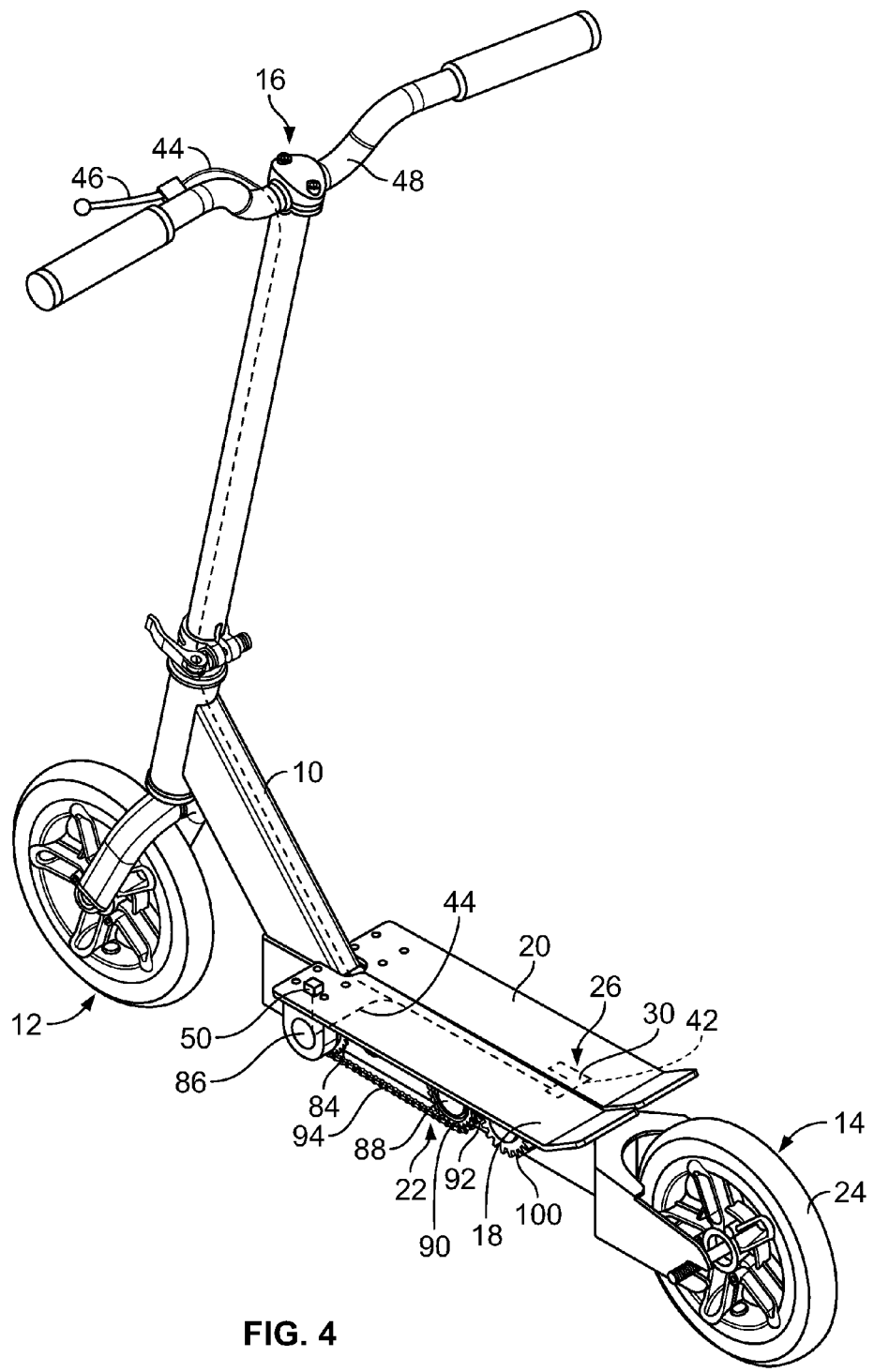
FIG. 4 shows a top perspective view of a second embodiment of a scooter according to the present invention.

Referring to FIGS. 1 and 4, a first lever arm 18 is pivotally mounted on frame 10 generally at a first distal end. A second lever arm 20 is pivotally mounted on frame 10 adjacent first lever arm 18 generally at a first distal end. The second free distal end of first and second lever arms 18, 20 are operable to pivot up and down in a lever action arrangement. Together, first and second lever arms 18, 20 define a rider platform on which a rider can stand.

A drive unit, designated generally as 22, is operatively connected to first and second lever arms 18, 20 and rear wheel assembly 14 so that the up and down lever action turns a rear wheel 24 to propel the scooter.

Referring to FIGS. 4 and 8, a detent lock, designated generally as 26, is provided for releasably securing first and second lever arms 18, 20 to frame 10 to resist the up and down lever action of lever arms 18, 20 until detent lock 26 is released.

Referring to FIGS. 7-10, in the illustrated embodiment, detent lock 26 includes a first detent lock portion 28 carried on each of the first and second lever arms 18, 20, and a second detent lock portion 30 carried by frame 10. First and second detent lock portions 28, 30 engage for holding the second distal end of first and second lever arms 18, 20 in a down position generally level with frame 10. This provides a stable fixed rider platform on which the rider can stand to coast on the scooter without having to use the drive system or the lever arms accidentally moving up or down. By disengaging second detent lock portion 30 from first detent lock portion 28, up and down pivoting movement of first and second lever arms 18, 20 is restored to allow the drive system to propel the scooter.

Figure 10:
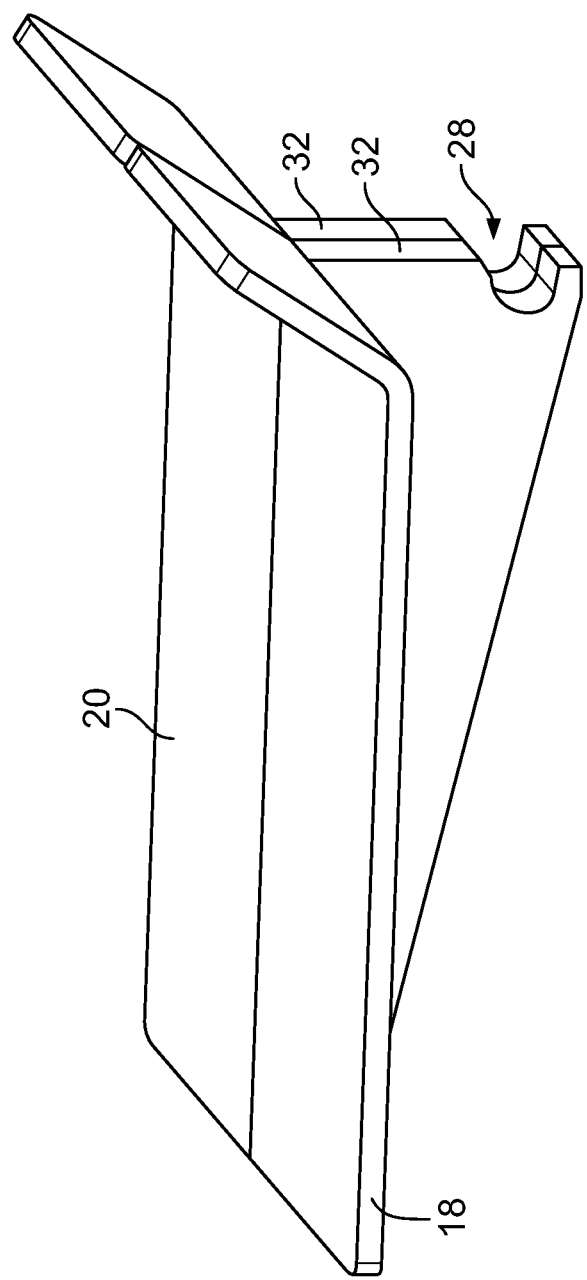
FIG. 10 shows an arrangement of lower extension plates on the lever arms according to the present invention.

Referring to FIGS. 7 and 10, in the illustrated embodiment, each of first and second lever arms 18, 20 include a lower extension plate 32 projecting downward from a bottom side of each of lever arms 18, 20. As shown in FIG. 7, lower extension plate 32 can extend along an exterior side of frame 10. Alternatively, referring to FIGS. 10 and 11, lower extension plates 32 can be arranged adjacent each other aligned over frame 10 for being received into a plate slot 34 of frame 10 when first and second lever arms 18, 20 are moved to a down position.

Referring to FIGS. 7 and 10, in the illustrated embodiment, first detent lock portion 28 is defined by a lock slot disposed in a distal end portion of lower extension plate 32 on each of lever arms 18, 20. Second detent lock portion 30 is defined by a lock arm movably carried on frame 10. Referring to FIG. 8, lock arm 30 is operable between a locked position received into lock slot 28 for holding first and second lever arms 18, 20 in a down position, and an unlocked position in which lock arm 30 is removed from lock slot 28 allowing up and down pivoting movement of first and second lever arms 18, 20.

In the illustrated embodiment, lock arm 30 is a generally L-shaped plate pivotally mounted on frame 10. A pin slot 36 is disposed in the L-shaped plate receiving a pin 38 around which lock arm 30 pivots when actuated. Referring to FIGS. 7 and 8, a first distal end, designated generally as 40, of lock arm 30 engages lock slot 28.

Referring to FIGS. 4 and 8, a second distal end, designated generally as 42, of lock arm 30 is connected to an actuator cable 44 so that movement of actuator cable 44 causes a pivotal movement of lock arm 30 around pin 38 in frame 10 to move between the locked and unlocked positions with lock slot 28. Actuator cable 44 is operatively connected to a control member disposed on at least one of handle bar assembly 16 and either of first and second lever arms 18, 20.

Referring to FIG. 4, in the illustrated embodiment, the control member can be a hand lever 46 carried on a handle bar 48 of handle bar assembly 16. In an alternative or complimentary arrangement, the control member can be a foot lever 50 carried on at least one of first and second lever arms 18, 20. By depressing hand lever 46 or foot lever 50, actuator cable 44 pivots the L-shaped lock arm 30 to withdraw first distal end 40 from lock slot 28 in lower plate extensions 32. Optionally, in a non illustrated embodiment, lock slot 28 may be formed directly into first and second lever arms 18, 20 and lock arm 30 arranged on frame 10 so that it directly engages the lock slot formed into the lever arms.

Referring to FIGS. 7-9, in the illustrated embodiment, lock arm 30 includes a first slanted engaging face 52 disposed on first distal end 40. Lower extension plates 32 include a second slanted engaging face 54 complementary to first slanted engaging face 52 of lock arm 30. Accordingly, a downward movement of lower extension plates 32 direct second slanted engaging face 54 against first slanted engaging face 52 to cause a lateral movement of lock arm 30 along pin slot 36 so that lock arm 30 does not interfere with the downward movement of lower extension plate 32 when lever arms 18, 20 are being operated to propel the scooter.

Referring to FIGS. 11-14, rear wheel assembly 14 includes a brake unit, designated generally as 56, operatively associated with rear wheel 24.

Figure 11:
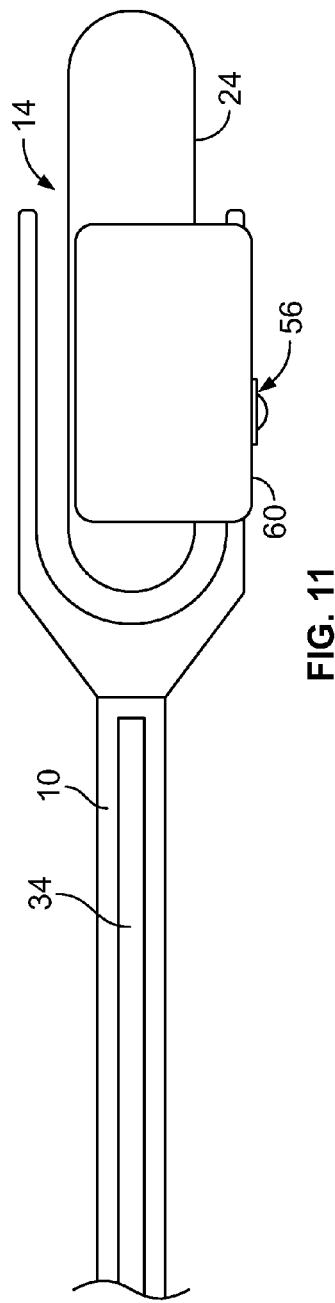
FIG. 11 shows a top view of a rear wheel assembly and brake unit according to the present invention.
Figure 12:
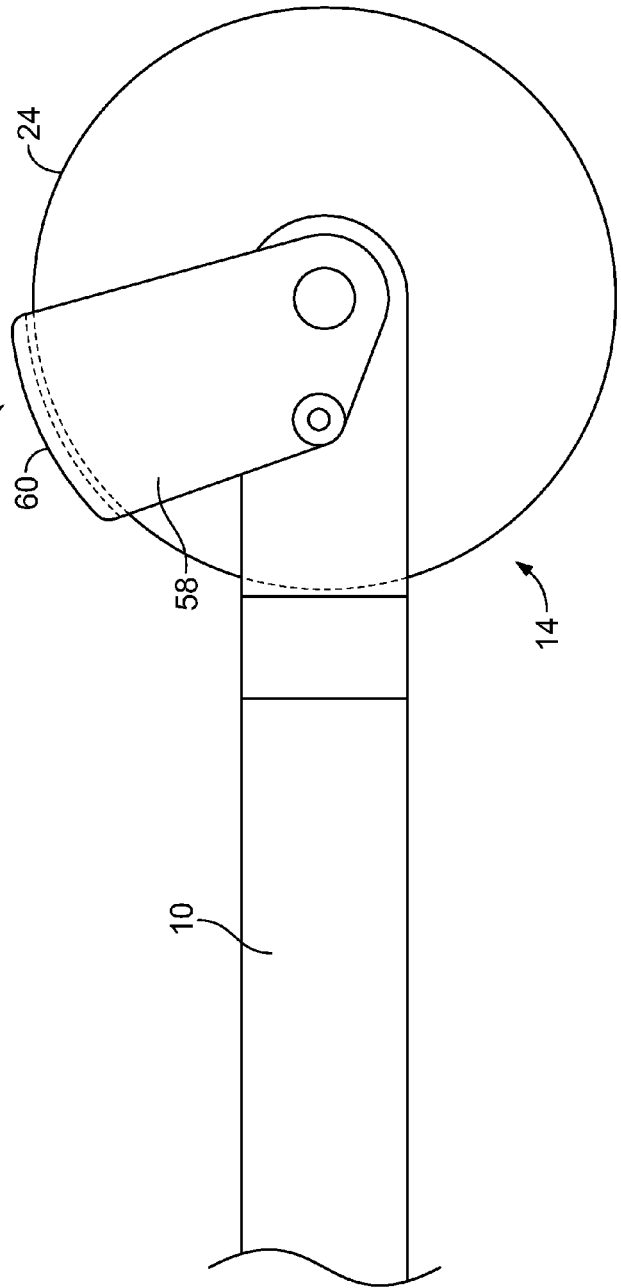
FIG. 12 shows a side view of a rear wheel assembly and brake unit according to the present invention.

Referring to FIGS. 11 and 12, in the illustrated embodiment, brake unit 56 includes a support arm 58 mounted to frame 10 and extending generally vertically adjacent rear wheel 24. A flexible brake arm 60 is carried on support arm 58 in a live hinge arrangement and extends laterally across rear wheel 24. Accordingly, applying a downward force, such as by stepping on the flexible brake arm 60, causes engagement with rear wheel 24 to cause friction on rear wheel 24 to stop rotation.

Figure 13:
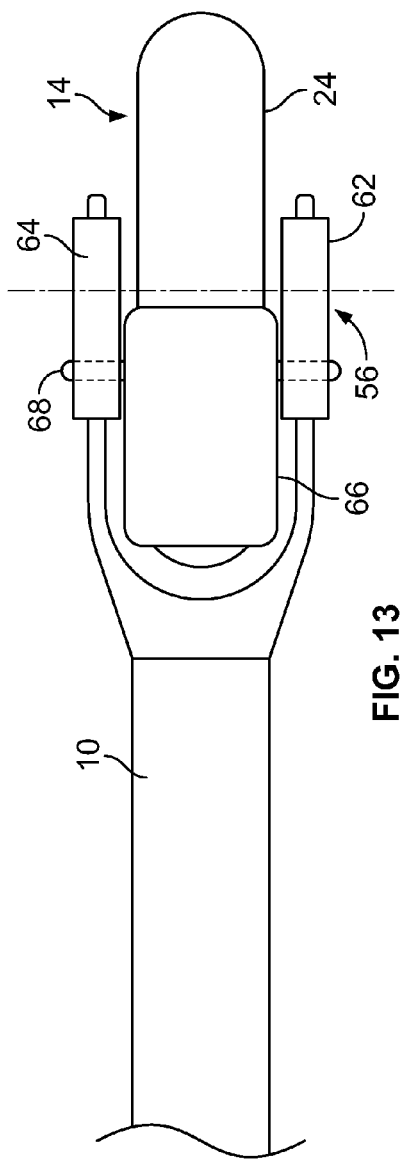
FIG. 13 shows a top view of a rear wheel assembly and alternative embodiment brake unit according to the present invention.
Figure 14:
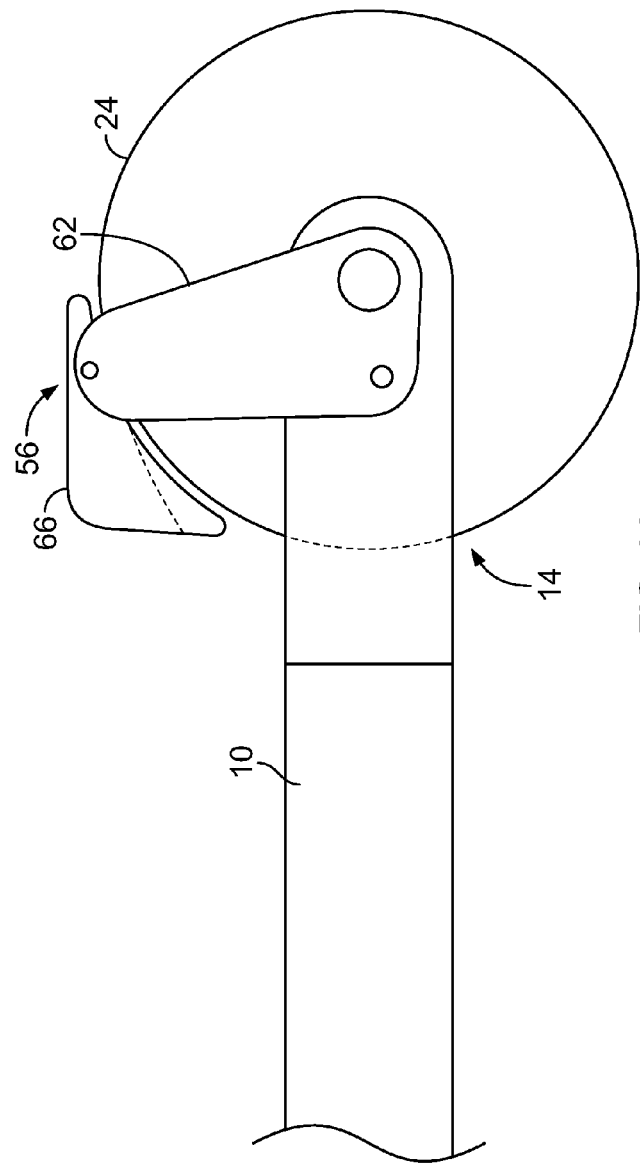
FIG. 14 shows a side view of a rear wheel assembly and the alternative embodiment brake unit according to the present invention; and, FIG. 15 shows a side view of an alternative arrangement of the drive system shown in the embodiment of FIGS. 1-3.

Referring to FIGS. 13 and 14, an alternative embodiment of brake unit 56 is illustrated, including a first support arm 62 carried on a first side of frame 10 adjacent a first side of rear wheel 24. A second support arm 64 is carried on a second side of frame 10 adjacent a second side of rear wheel 24. A brake lever 66 is pivotally carried on a spindle 68 supported by first and second support arms 62, 64 and disposed over rear wheel 24. Accordingly, a downward force on brake lever 66 causes engagement with rear wheel 24 to brake the wheel.

Figure 2:
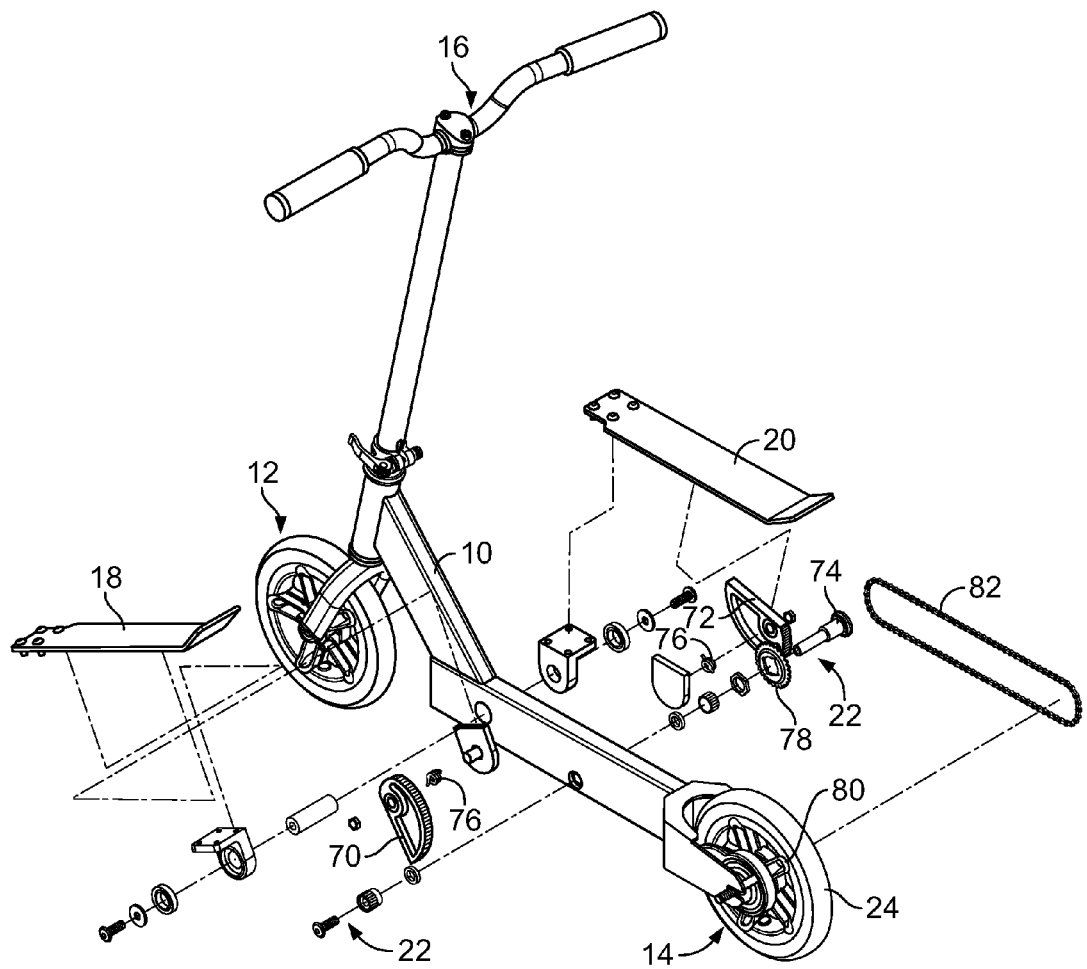
FIG. 2 shows an exploded view of FIG. 1.
Figure 3:
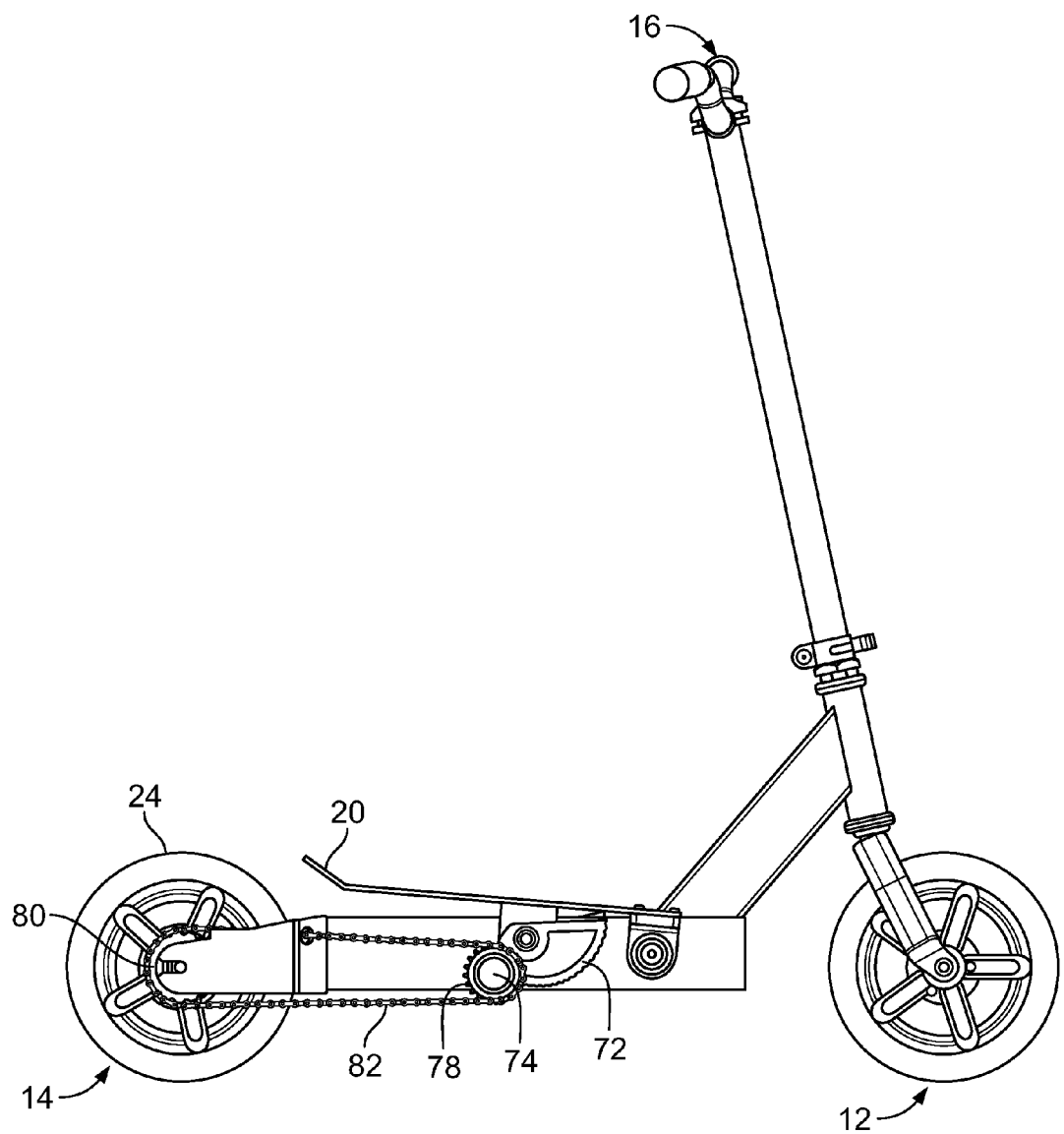
FIG. 3 shows a side view of the first embodiment of a scooter according to the present invention.

Referring to FIGS. 1-3, in the illustrated embodiment, drive unit 22 includes a first cam 70 carried on a bottom side of first lever arm 18 and a second cam 72 carried on a bottom side of second lever arm 20 for engage a drive shaft 74. Drive shaft 74 is rotatably carried by frame 10 and engages cams 70, 72. A torsion spring 76 (FIG. 2) is operatively associated with each of first cam 70 and second cam 72 for biasing the cams against drive shaft 74, which can direct lever arms 18, 20 upwardly when not being moved downward. The engaging surfaces of cams 70, 72 and drive shaft 74 can be knurled for additional engagement.

A first sprocket 78 is carried by drive shaft 74 and a second sprocket 80 is carried by rear wheel assembly 14. First sprocket 78 is connected to second sprocket 80 by a drive chain 82. Accordingly, a downward movement of cams 70, 72 against drive shaft 74 causes rotation of the drive shaft to turn first sprocket 78, which turns drive chain 82 and second sprocket 80 to rotate rear wheel 24. Preferably, second sprocket 80 is a one way clutch sprocket that allows rear wheel 24 to spin free when second sprocket 80 is not being rotated by drive chain 82 so that lever arms 18, 20 do not move up and down when coasting or attempt to move up when locked down by detent lock 26.

Figure 15:
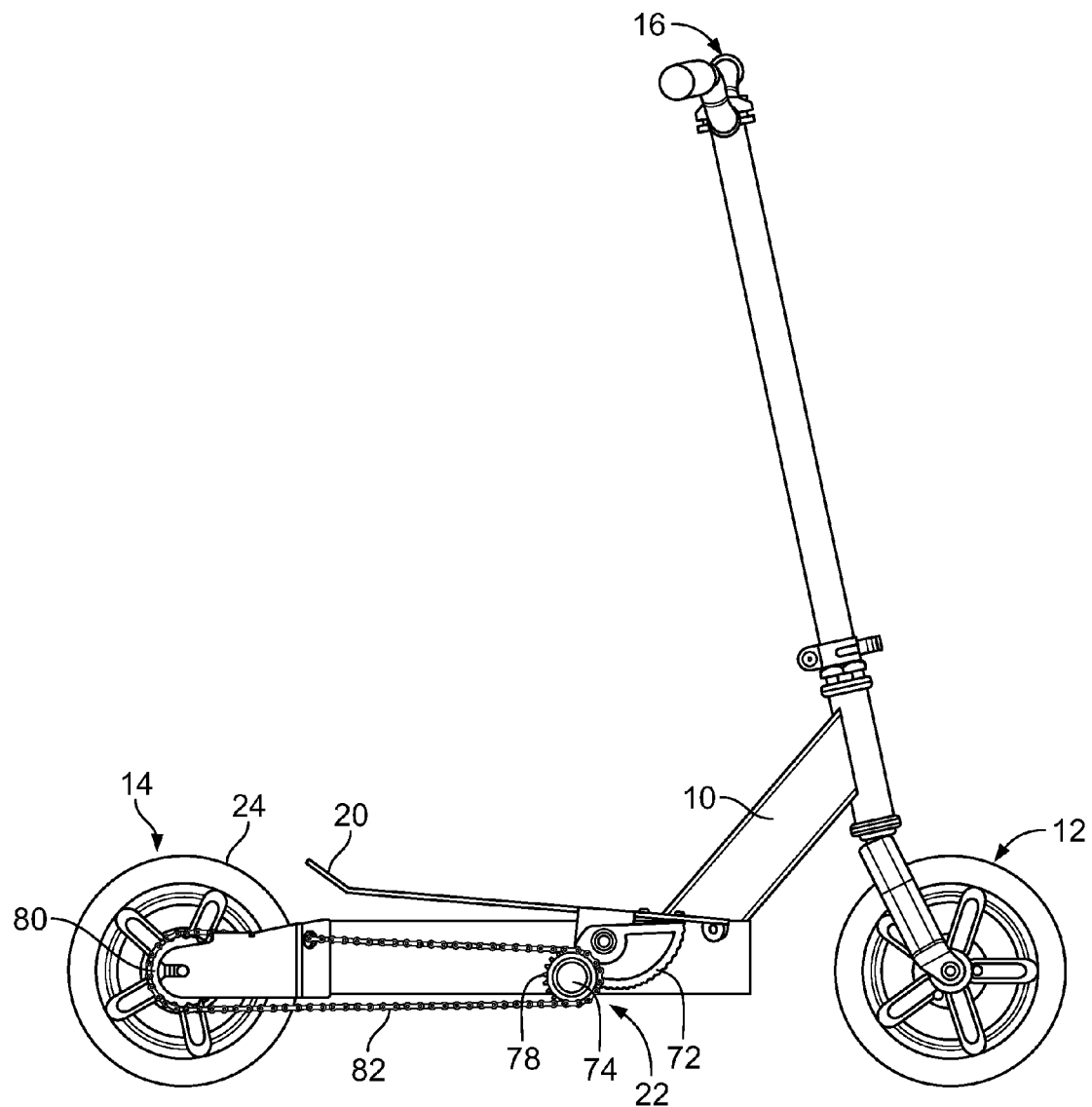

Referring to FIG. 15, in an alternative arrangement of drive unit 22 involving cams 70, 72, the cams are pivotally carried on the bottom side of lever arms 18, 20 closer to the pivot connection of each of lever arms 18, 20 on frame 10. Further, drive shaft 74 and related drive unit components as noted above are accordingly also moved forward and extended along frame 10 to accommodate the repositioning of cams 70, 72. By moving the cams forward and closer to the fulcrum point of each lever arm 18, 20, the force of each downward stroke of lever arms 18, 20 is increased to improve the efficiency and drive output per stroke of cams 70, 72 acting on drive shaft 74.

Figure 5:
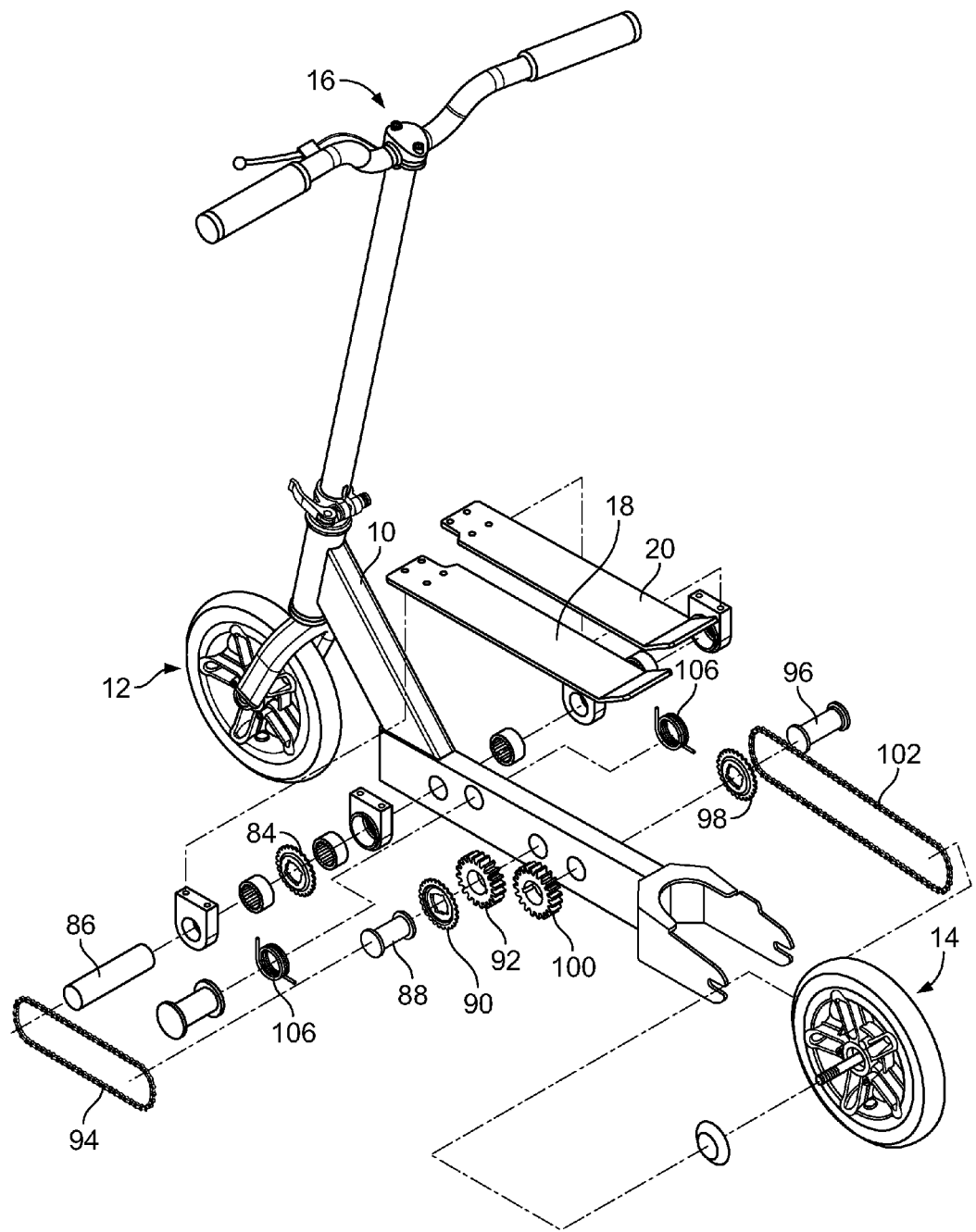
FIG. 5 shows an exploded view of FIG. 4.
Figure 6:
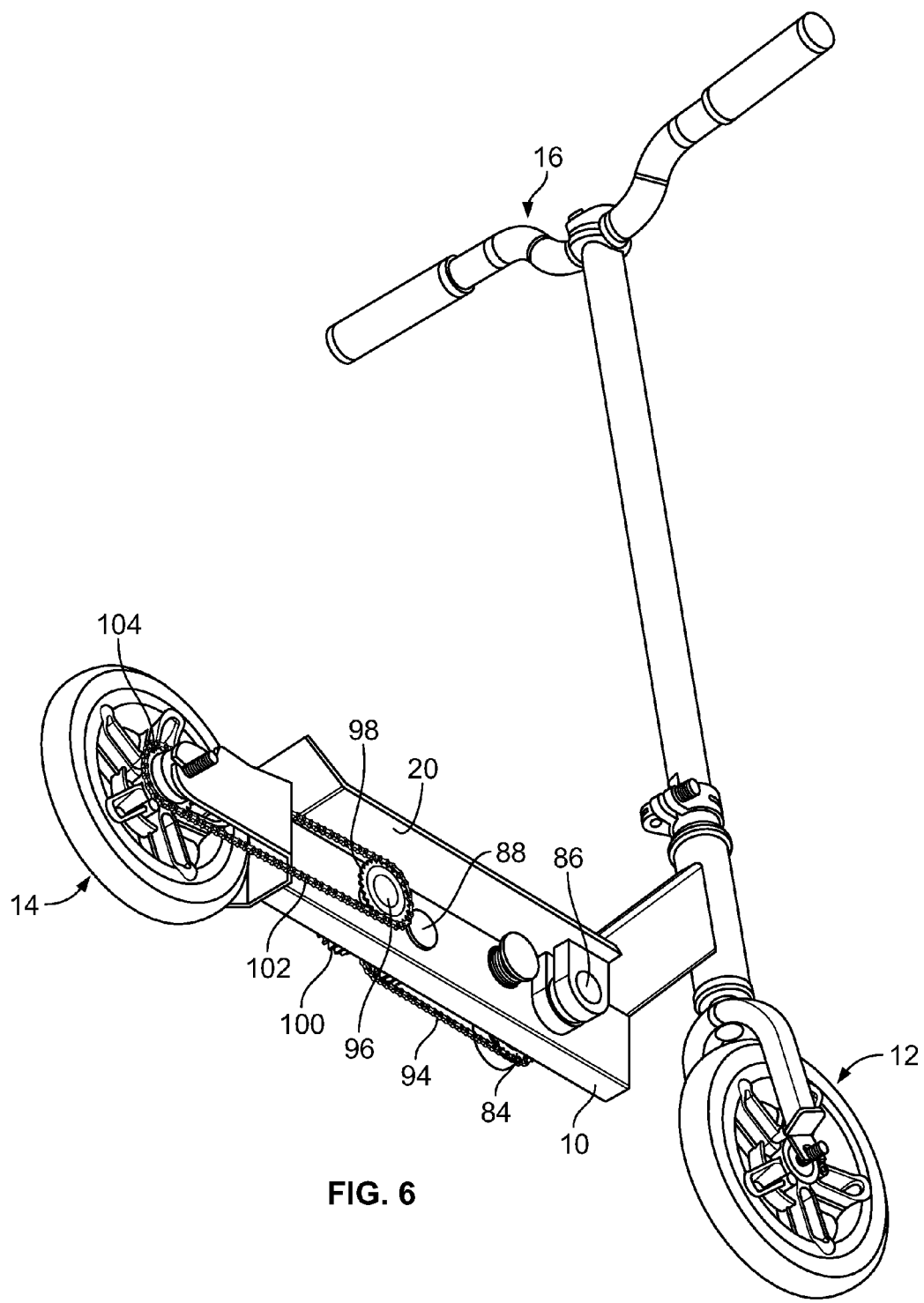
FIG. 6 shows a bottom perspective view of the second embodiment of a scooter according to the present invention.

Referring to FIGS. 4-6, in an alternative embodiment, drive unit 22 includes a first sprocket 84 carried on a first spindle 86 rotatably carried by frame 10. First and second lever arms 18, 20 are operatively connected to first spindle 86 for rotating the spindle when the lever arms move up and down. A second spindle 88 is rotatably carried by frame 10 and carrying a second sprocket 90 and a first gear 92. A first drive chain 94 connects first sprocket 84 and second sprocket 90 so that rotation of first spindle 86 causes rotation of second spindle 88 to turn first gear 92. A third spindle 96 is rotatably carried by frame 10 and carries a third sprocket 98 and a second gear 100. Second gear 100 engages first gear 92 to turn third spindle 96 and third sprocket 98 in a direction opposite first and second spindles 86, 88. A forth sprocket 104 is carried by rear wheel assembly 14 and operatively connected to third sprocket 98 by a second drive chain 102. Accordingly, rotation of third sprocket 98 causes forth sprocket 104 to turn rear wheel 24.

Referring to FIG. 5, a torsion spring 106 is carried by frame 10 and operatively connected to each of first and second lever arms 18, 20 for biasing the lever arms upward from the frame after a downward movement to operate drive unit 22.

While a preferred embodiment of the invention has been described using specific terms, such description is for illustrative purposes only, and it is to be understood that changes and variations may be made without departing from the spirit or scope of the following claims.

What is claimed is:

1. A non-motorized scooter comprising:
   a frame carrying a front wheel assembly, a rear wheel assembly, and a handle bar assembly operatively associated with said front wheel assembly;
   a first lever arm pivotally mounted on said frame;
   a second lever arm pivotally mounted on said frame adjacent said first lever arm, wherein said first and second lever arms move up and down in a lever action and define a rider platform;
   a drive unit operatively connected to said first and second lever arms and said rear wheel assembly so that said up and down lever action turns a rear wheel; and,
   a detent lock releasably securing said first and second lever arms to said frame to resist said up and down lever action of said lever arms until said detent lock is released.

2. The scooter of claim 1 wherein said detent lock includes a first detent lock portion carried on each of said first and second lever arms, and a second detent lock portion carried by said frame, wherein said first and second detent lock portions engage for holding said first and second lever arms in a down position generally level with said frame to provide a stable fixed rider platform, and disengage for allowing up and down pivoting movement of said first and second lever arms.

3. The scooter of claim 1 wherein each of said first and second lever arms includes a lower extension plate projecting downward from a bottom side of each of said lever arms.

4. The scooter of claim 3 wherein a plate slot is disposed in said frame receiving said lower extension plate on each of said lever arms when in a down position.

5. The scooter of claim 3 wherein said detent lock includes a first detent lock portion defined by a lock slot disposed in a distal end portion of said lower extension plate on each of said lever arms.

6. The scooter of claim 5 wherein said detent lock includes a second detent portion defined by a lock arm movably carried on said frame, wherein said lock arm is operable between a locked position received into said lock slot for holding said first and second lever arms in a down position, and an unlocked position in which said lock arm is removed from said lock slot allowing up and down pivoting movement of said first and second lever arms.

7. The scooter of claim 6 wherein said lock arm is a generally L-shaped plate pivotally mounted on said frame, wherein a first distal end of said lock arm is operatively associated with said lock slot, and a second distal end of said lock arm is connected to an actuator cable so that movement of said actuator cable causes a pivotal movement of said lock arm to move between said locked and unlocked positions.

8. The scooter of claim 7 wherein said actuator cable is operatively connected to a control member disposed on at least one of said handle bar assembly and either of said first and second lever arms.

9. The scooter of claim 8 wherein said control member includes a hand lever carried on a handle bar of said handle bar assembly operatively connected to said actuator cable for pivoting said lock arm.

10. The scooter of claim 8 wherein said control member includes a foot lever carried on at least one of said first and second lever arms operatively connected to said actuator cable for pivoting said lock arm.

11. The scooter of claim 6 wherein said lock arm includes a first slanted engaging face disposed on a distal end of said lock arm that is received into said lock slot.

12. The scooter of claim 11 wherein said lower extension plate includes a second slanted engaging face complementary to said first slanted engaging face of said lock arm, wherein a downward movement of said lower extension plate directs said second slanted engaging face against said first slanted engaging face to cause a lateral movement of said lock arm so that said lock arm does not interfere with the downward movement of said lower extension plate.

13. The scooter of claim 1 wherein said rear wheel assembly includes a brake unit operatively associated with said rear wheel.

14. The scooter of claim 13 wherein said brake unit includes a support arm mounted to said frame and extending generally vertically adjacent said rear wheel, and a flexible brake arm carried on said support arm in a live hinge arrangement and extending laterally across said rear wheel, wherein a downward force on said flexible brake arm causes engagement with said rear wheel.

15. The scooter of claim 13 wherein said brake unit includes a first support arm carried on a first side of said frame adjacent a first side of said rear wheel, a second support arm carried on a second side of said frame adjacent a second side of said rear wheel, and a brake lever pivotally carried by said first and second support arms and disposed above said rear wheel, wherein a downward force on said brake lever causes engagement with said rear wheel.

16. The scooter of claim 1 wherein said drive unit includes a cam pivotally carried on a bottom side of at least one of said first and second lever arms.

17. The scooter of claim 16 wherein said drive unit includes a drive shaft rotatably carried by said frame engaging said cam, a first sprocket carried by said drive shaft, a second sprocket carried by said rear wheel assembly, and said first sprocket connected to said second sprocket by a drive chain, wherein downward movement of said cam against said drive shaft causes rotation of said drive shaft to turn said first sprockets which turns said drive chain and second sprocket to rotate said rear wheel.

18. The scooter of claim 17 wherein said drive unit includes a first cam carried on a bottom side of said first lever arm and a second cam carried on a bottom side of said second lever arm for engage said drive shaft, and a torsion spring operatively associated with each of said first cam and said second cam for biasing said cam against said drive shaft.

19. The scooter of claim 1 wherein said drive unit includes a first sprocket carried on a first spindle rotatably carried by said frame, and said first and second lever arms operatively connected to said spindle for rotating said spindle when said lever arms move up and down;
   a second spindle rotatably carried by said frame and carrying a second sprocket and a first gear, wherein a first drive chain connects said first sprocket and said second sprocket so that rotation of first spindle causes rotation of said second spindle to turn said first gear;

a third spindle rotatably carried by said frame and carrying a third sprocket and a second gear, wherein said second gear engages said first gear to turn said third spindle and said third sprocket in a direction opposite said first and second spindle; and, a forth sprocket carried by said rear wheel assembly operatively connected to said third sprocket by a second drive chain, wherein rotation of said third sprocket causes said forth sprocket to turn said rear wheel.

20. The scooter of claim 1 including at least one torsion spring carried by said frame operatively connected to each of said first and second lever arms for biasing said lever arms upward from said frame.

* * * * *